United States Patent [19]
Christie et al.

[11] Patent Number: 5,333,926
[45] Date of Patent: Aug. 2, 1994

[54] RAILWAY WHEEL

[75] Inventors: C. Dale Christie, Naperville; Michael T. Gallagher, Highland Park; Michael J. Hendricksen, Prospect Heights; John D. Oliver, Flossmoor; Mark A. Polzin, Bartlett, all of Ill.

[73] Assignee: AMSTED Industries Incorporated, Chicago, Ill.

[21] Appl. No.: 36,015

[22] Filed: Mar. 23, 1993

[51] Int. Cl.⁵ .................................................. B60B 17/00
[52] U.S. Cl. ......................................... 295/21; 295/24
[58] Field of Search ...................... 295/21, 22, 24, 1; 301/62, 63.1; 152/17, 69

[56] References Cited

U.S. PATENT DOCUMENTS

| | | | |
|---|---|---|---|
| 2,786,020 | 10/1956 | Sylvester | 295/27 |
| 3,038,755 | 6/1962 | Keysor | 295/21 |
| 4,145,079 | 3/1979 | Greenfield et al. | 295/21 |
| 4,471,990 | 9/1984 | Hirakawa et al. | 295/21 |
| 5,039,152 | 8/1991 | Esaulov et al. | 295/21 |

FOREIGN PATENT DOCUMENTS 827076  1/1952  Fed. Rep. of Germany ........ 295/21

*Primary Examiner*—Russell D. Stormer
*Attorney, Agent, or Firm*—Edward J. Brosius; F. S. Gregorczyk; Thomas J. Schab

[57] ABSTRACT

A steel railway wheel with reduced axial flange deflection and reduced, thermally-induced, residual-tensile stress in the wheel rim, has a clearly defined relationship among the plate angle, the maximum depth of curvature of the wheel plate segment, the location of the maximum depth of curvature, the wheel hub and the rim, which relationship is provided for plate segments both concave and convex with respect to the wheel outboard surface.

14 Claims, 4 Drawing Sheets

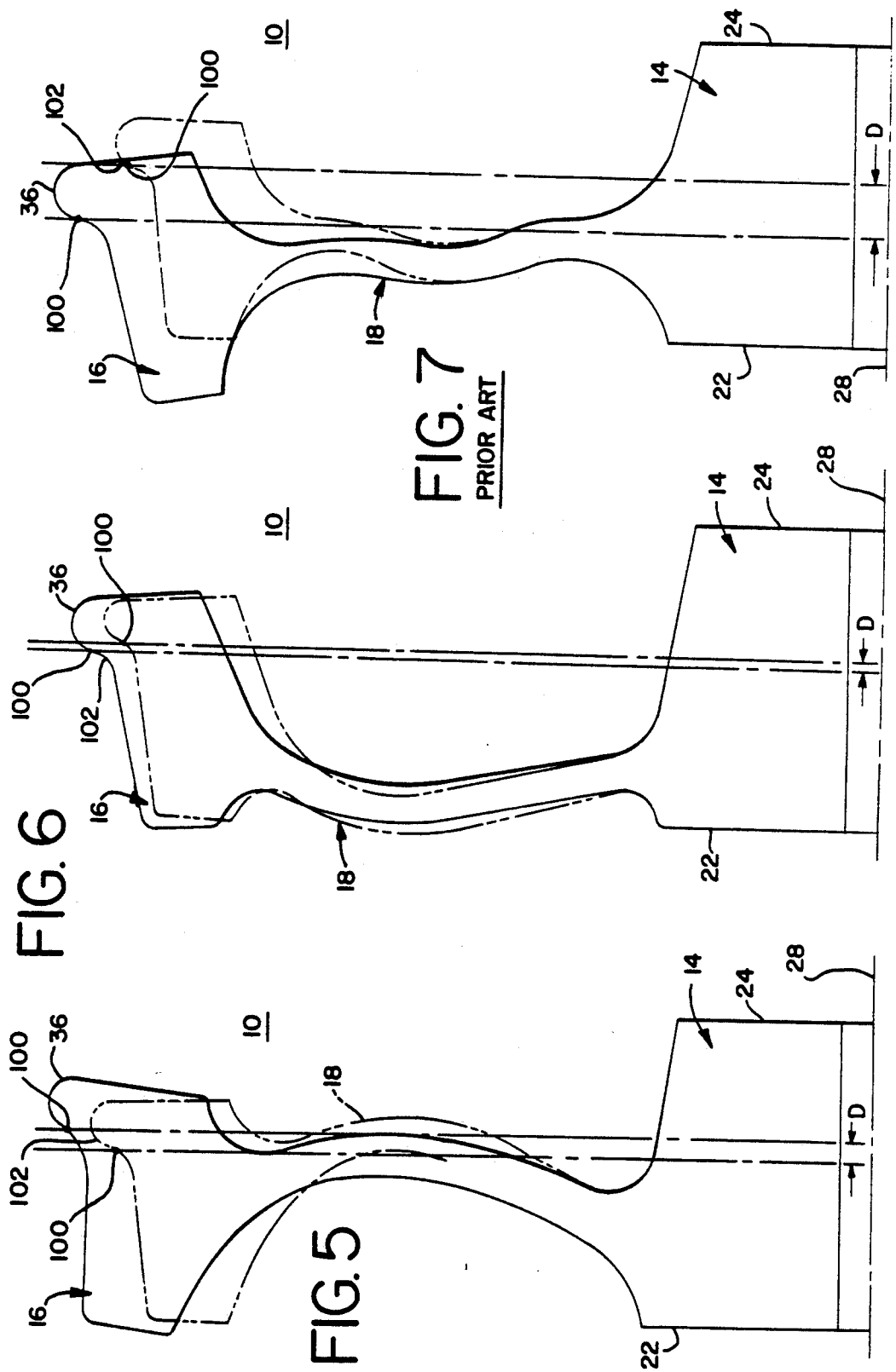

RAILWAY WHEEL

BACKGROUND OF THE INVENTION

The present invention relates to wheels for railway cars and more specifically to steel wheels having a structure to provide low axial flange deflection and low residual tensile stress from thermal cycling, which generally results from brake shoe friction heating on the wheel tread surface.

Railway wheels are provided in various shapes, which shapes were generally devised for specific applications or to overcome a specific problem, such as wheel deflection and residual stress. Steel railway wheels may be machined, formed, wrought or cast. Each of the following variations or configurations of materials, shape and structure were provided to compensate for, or to overcome, one of the above-noted problems. Illustrative of an early attempt to resolve a plurality of problems in a single structure is the wheel taught and illustrated in U.S. Pat. No. 2,768,020 to Sylvester, which provided a cast steel wheel to compensate for or to overcome the inherent residual stresses generally attributed to cast steel wheels, as compared to chilled iron or wrought steel wheels. The wheel structure had a contour and form intended to hinder the formation of residual stresses as-cast wheels. The structure taught and illustrated included a larger plate and fillet construction at both the hub and rim connections to the plate segment. In addition, it was noted that this disclosed cast steel wheel structure was to provide a wheel having an increased capacity to dissipate heat generated in the rim of the wheel as compared to earlier cast steel wheel arrangements. The Sylvester-'020 patent asserted a railway wheel form and contour with increased strength without increased material mass to accommodate higher wheel load capacity. This may be equatable to asserting a wheel with greater load carrying capacity without a concomitant increase in the overall mass of the wheel. In the illustrated structure of this Sylvester-'020 patent, the plate or web portion has a generally straight cross-sectional area and the fillets are contoured or angled to smoothly blend into the rim to provide maximum mass at the rimfillet engagement points. This cast steel wheel form and contour was to provide high operational resistance to thermal checking and cracking under severe loading and braking conditions. However, there was no appreciation or discussion of the disclosed wheel structure effect, if any, upon wheel deflection, that is a displacement of the wheel flange about the hub, with the increase in temperature associated with braking conditions. In the context of the present application, wheel deflection refers to movement of the wheel flange generally in a wheel inboard or outboard direction and parallel to the longitudinal axis of the wheel. As the rim is rigidly connected to the wheel hub by the web or plate, there is an axial component to the deflection. Wheel deflection will be further described below.

U.S. Pat. No. 3,038,755-Keysor recognized prior wheels are, to a greater or lesser extent, subject to stress cracks in the plate portion of the wheel in the areas adjacent to the hub and the rim. Further, he identified the fact that stress cracks in the plate portion of the wheel were initiated primarily by repeated braking applications, which developed large heat concentrations generated from frictional contact of brake shoes on the wheel rim. This elevated temperature condition in the wheel rim induced expansion in the radial direction, which expansion created highly concentrated stress patterns in the plate portion of the wheel. The high stress areas were likely to develop cracks from repeated expansion and contraction with repeated brake applications, which can potentially result in ultimate wheel failure. The railway wheel taught in the Keysor-'755 patent disclosure particularly provided a railway wheel for repeated servicing. The requirement of a wheel with increased fatigue life expectancy was also recognized and identified, which wheel would be inherently resistant to stress cracks from repeated brake applications during service. The disclosure specifically taught a wheel plate having an arcuate cross-sectional contour. The plate of the wheel is tangent to a line lying in a plane positioned midway between the front and rear surfaces of the hub and normal to the axis of rotation of the wheel, which point of tangency lies within the hub. Parabolic curves were particularly taught for the fillets, which are provided at the intersections between the hubs and the flange or rim portions of the wheel. The specific parabolic curves for each fillet vary with a particular size and style of cast wheel. The structure taught and illustrated in the Keysor-'755 patent provided a wheel with an arcuate plate connected to the hub and the rim by fillets having a gradually changing radius of curvature, which structure was asserted to substantially lessen the shock fatigue or the impact from shock fatigue and stress cracks, and improved the strength of these wheels as compared to prior art wheels. Along with this improved strength characteristic, this wheel structure was reported to decrease the weight of the wheel while providing the same rated or weighted service and life as earlier prior art wheels.

U.S. Pat. No. 4,145,079 to Greenfield et al. teaches a railroad car wheel structure, but recognized that there is a continuing problem between fracture in the regions of connections between the wheel plate and hub or rim, when the wheel is subjected to the stresses from usage on rail cars. Heat induced fracture or fissuring was recognized as being generated from contact between the brake shoe and wheel during normal braking operations. More particularly, the expansion-contraction of thermal cycling from braking induced residual stresses and fracturing. This patent acknowledged that previous efforts to minimize the effects of the mechanical and thermal stresses have included increasing the surface area for better heat dissipation, increasing the metal volume for added strength and modifying the configuration of the plate that connects the hub and the rim.

A particular kind of plate, noted as a B-28 and D-28, are straight plate wheels. Similarly two curved plate designs were noted as CB-28 and CD-28, which are indicated as being the same as B-28 and D-28 except for their rim thickness. Inboard and outboard concave curved surfaces or fillets at each connection define transition regions between the hub or the rim and the plate. These curved surfaces provide a smooth progression or transitional area from the plate to the hub or rim and are intended to minimize stress concentration in these areas. Similarly wrought steel straight plate wheels of the B-28 configuration have been known to have a tendency to crack in the rear or inboard rim-to-plate fillet and in the front or outboard hub-to-plate fillet. As a result, a D-28 wheel incorporated a design change with a greater cross-section in the area of the hubbed plate connection and the curved transitional surfaces were provided with parabolic curves having their major axis disposed generally in the radial direction from the web. The sole intention of many of these changes in wheel structures is to reduce the level of stress in the critical transition zones regions between the hub or rim and the plates.

The Greenfield-'079 patent considered the tangential, vertical and lateral mechanical loads as well as the thermal loads from braking. The wheel structure placed the rim, hub and plate in a specific configuration, which potentially minimizes the need for transitional fillets or radii. The plate is arranged to join the hub adjacent to its in-board edge and the in-board conical surface of the plate merges into the inner radial surface of the hub. The juncture between the rim and plate is arranged for at least one of the in-board and out-board conical surfaces of the plate to merge directly into the respective radial in-board or radial out-board surface of the rim. There are several embodiments illustrated in this application but the configurations provide for the cantilever arrangement of the rim to the plate allowing distortion during load application to the rim, as in braking. Physical movement within the wheel itself is considered to provide counteradditive, rather than additive, stresses to those stresses present due to vertical and lateral loading. This movement purportedly reduces the overall stress to provide substantial improvements over straight plate design and to achieve operating stresses within acceptable limits as their proposed inventive concept. However, it is the direct merger of at least one of the surfaces defined by the plate into at least one radial edge of each of the hub and rim that minimizes the usage of traditional concave transitional fillets, which is thought to provide improved resistance to the stress concentration in these critical areas.

U.S. Pat. No. 4,471,990-Hirakawa provides a railroad car wheel formed by rolling, which wheel has fillets formed so that each has an angle of inclination of approximately 20 degrees with respect to the horizontal direction. The connecting portions of the plate are perpendicular to the axis of the wheel and are preferably as long as possible. The wheel plate portion is connected to the bossed portion at a point displaced somewhat inwardly in the center of the width of the bossed portion with respect to the track, that is the hub portion and the plate portion are connected to the rim substantially in the middle of the width of the rim. This car wheel is provided with a shape to minimize internal residual stress after extraordinary brake force is applied to the wheel at its rim. There is no accommodation for wheel deflection associated with wheel operation nor is the discussion directed to the radial expansion of the wheel during normal operations.

U.S. Pat. No. 5,039,152-Esaulov et al. provides a railway wheel defined by a plurality of equations and basic wheel parameters including the diameter of the rolling surface and the outside diameter of the hub. The aim of this apparatus and its disclosure is to provide a railway wheel configuration to insure mutual compensation of stresses arising in the wheel under a complex load. In this disclosure, the "plate" joining the hub and the rim has a median longitudinal axis and curveilinear generating lines "conjugating" the configurations of the rim and hub by radius curves of a radius determined from a given mathematical equation or expression. The cross-sectional area of the disc, which is defined by a cylindrical secant surface coaxial with the hub, is equidimensional, but the "point of conjugation" of the median longitudinal axis of the disc with the hub is offset from its middle and the median longitudinal axis of disc configuration has rectilinear portions with curvilinear portions interposed therebetween. The rectilinear portion of the median longitudinal axis of the disc at the side of the rim conjugating with the first curvilinear portion is described by a second equation and this conjugates with the second curvilinear portion described by a further expression and each of the succeeding curvilinear portions are defined by equations. In summary, the structure of the wheel has a curvilinear portion that has a complex of at least three curved segments in the plate joining the hub and the rim and, both forward and reverse fillets apparently defined with the same radii joining the curvilinear disc or plate portion. This complex wheel structure is the product of specific analyses and structural arrangements defined by a plurality of equations. The disclosed structure provides variations in the shapes of a central joining plate to accommodate variations in stress between the tensile and tangential stresses at the rim due to thermal and mechanical loads.

SUMMARY OF THE INVENTION

The present invention provides a steel railway wheel with reduced axial flange deflection and low residual tensile stresses from thermal cycling generally associated with braking and particularly braking at strained or severe conditions. More specifically, the invention shows a relationship between each of the wheel rim and hub, and the connecting plate. In the illustrated embodiments, a relationship exists to provide a location for the relative plate-to-rim and plate-to-hub junctions of the wheel. A plate contour may have a convex or concave curvature relative to the wheel outboard face, which curvature at a given location has an associated curvature-depth within a specified range. The wheel provided with the defining parameters of the present invention has a lower axial flange deflection and a lower residual tensile stress in the region of the wheel rim than is provided by presently available wheels.

BRIEF DESCRIPTION OF THE DRAWINGS

In the Figures of the Drawing, like reference numerals identify like components, and in the drawing:

FIG. 5 is a cross-sectional view of the railcar wheel of FIG. 2 with axial flange deflection toward the wheel rear hub surface;

FIG. 6 is a cross-sectional view of a railcar wheel as in FIG. 4 with axial flange deflection toward the wheel front hub surface;

FIG. 7 shows a cross-sectional view of a currently available railcar wheel and its attendant deflection at the same load inputs as in FIG. 5; and, FIG. 8 is an elevational view of a railcar wheel set on an axle.

DETAILED DESCRIPTION OF THE PREFERRED EMBODIMENT

Figure 1:
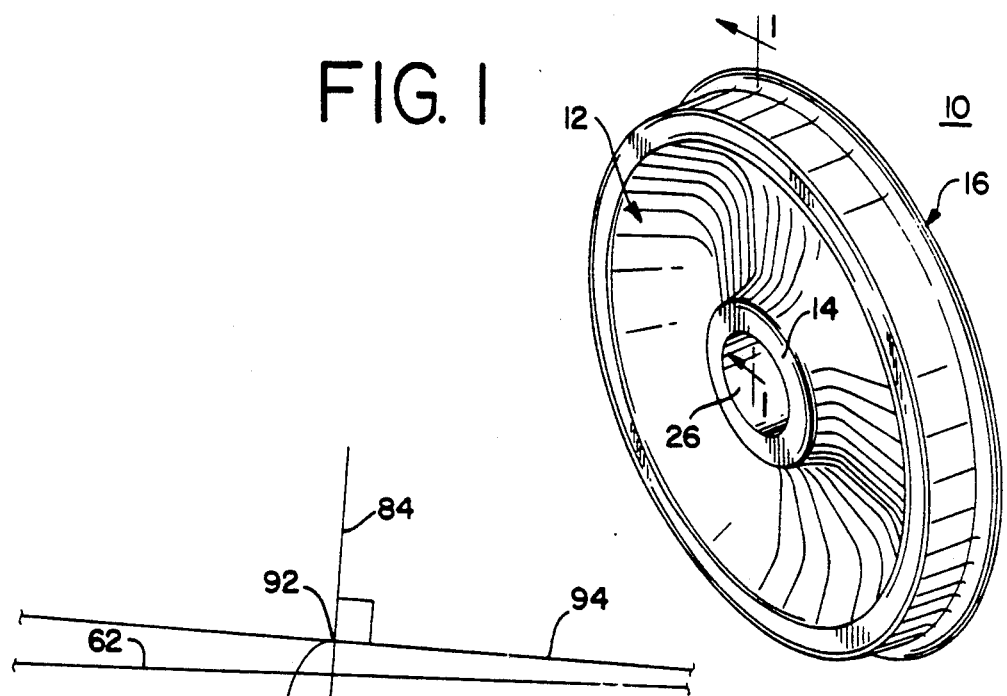
FIG. 1 is an oblique view of a railroad wheel at its outer wheel face.
Figure 8:
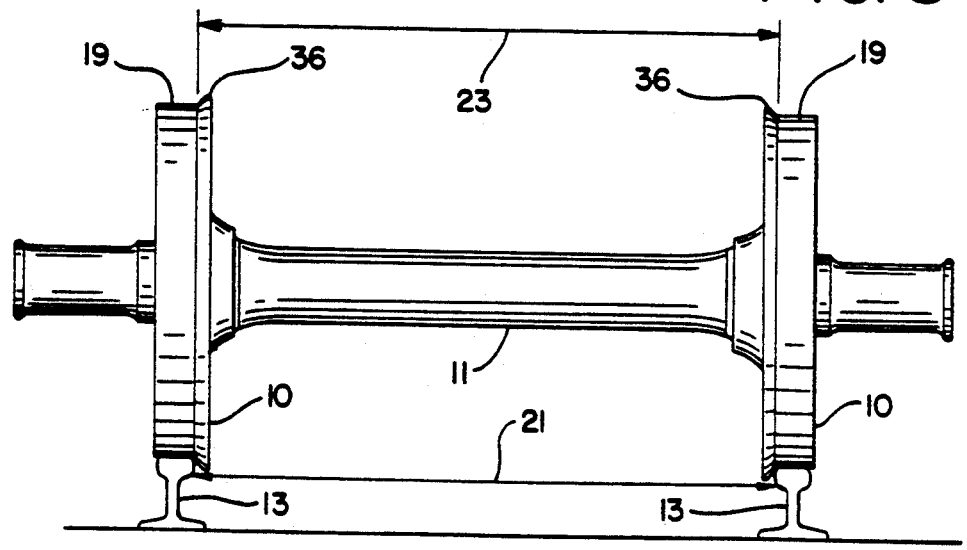

A railway wheel 10 with front or outboard face 12 is shown in perspective in FIG. 1. These railway wheels may be cast, wrought, machined or formed. Railway wheels 10 are generally mounted as a wheel pair at opposite ends of an axle 11 of a railcar wheelset as shown in FIG. 8, which is used to support a railcar (not shown). A train (not shown) is comprised of a plurality of railcars, however, like any vehicle, railcars not only require energy to move them, but require dissipation of energy to bring them and the train to a halt. Railcar wheels on passing trains appear to be tracking the rails with little or no variation in position. However, it is known that numerous variables influence wheel travel and alignment on rail tracks. Among the parameters influencing wheel-rail interaction are rail spacing, wheel spacing, wheel wear, rail wear, wheel shape, rail shape, wheel axial deflection, as well as wear on wheel truck elements effecting wheel wear and position (e.g., wheel-bearing wear).

The outboard spacing 23 between flanges 36 of wheels 10 on axle 11 in FIG. 8 is initially less than the rail spacing 21. During train, and thus wheel operation, this wheel-flange spacing will vary with deflection of flanges 36 at each wheel 10. During prolonged braking, wheel 10 is heated and rim 16 can grow radially outward from hub 14 and axially deflect. Outboard axial deflection of wheel flanges 36 can result in pinching and inboard deflection can result in poor ride quality. It is desirable to maintain the spacing between wheel flanges 36 to avoid too wide a flange spacing, which could lead to wheel-rail pinching, rail riding or rail climbing by the wheel or wheels 10. Alternatively, too narrow a spacing between the wheel flanges may permit poor car-ride quality associated with "slop" or "hunting".

During the braking of a train, brake shoes contact the wheel, usually at the wheel rim and tread surface, and generate a great deal of thermal energy at the rim segment. Heating from frictional contact between a brake shoe (not shown) and wheel 10 during normal operations causes expansion and contraction of the wheel elements, which induces stresses and strains in wheel 10. These different stress generators and factors may be different in magnitude and frequently act to move elements of wheel 10 in different directions, which can lead to mechanical failure of the wheel. It has been reported that this thermal energy can elevate the wheel rim temperature to 500 degrees centigrade or greater. Wheel 10, and particularly rim 16, is susceptible to residual tensile stress, which is noted at ambient temperatures, from the heating and cooling associated with braking operations and more specifically from a temperature gradient from the rim to the hub. The residual tensile stress in the rim can be developed in one heating and cooling cycle with the requisite temperature gradient in the wheel. The wheel structure of the present invention minimizes axial wheel flange deflection and reduces residual tensile stress from thermal cycling, especially in the wheel rim.

Figure 2:
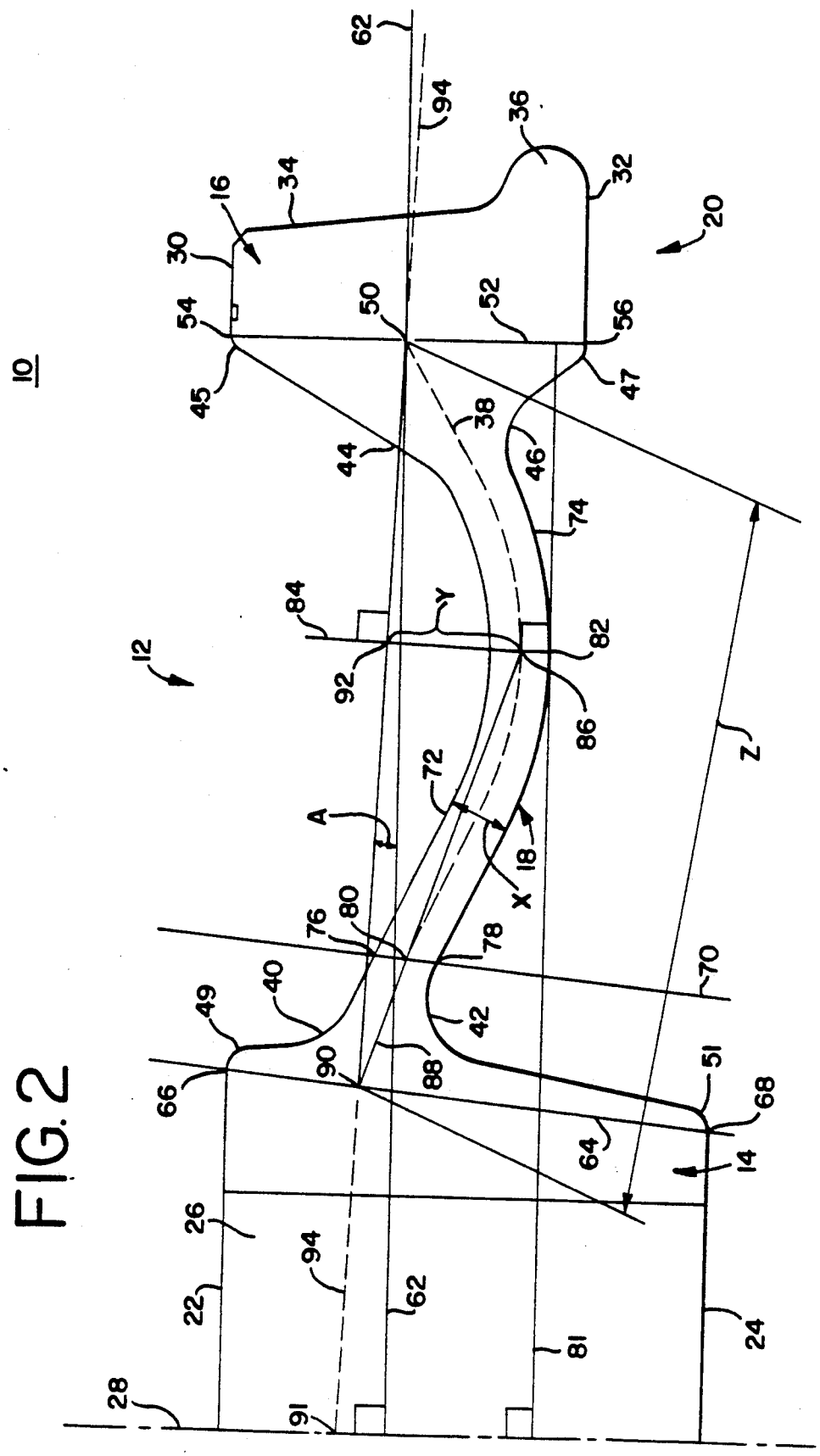
FIG. 2 is a cross-sectional view of the wheel in FIG. 1 taken along the line 1—1.

FIG. 2 shows one-half of a cross-sectional view of wheel 10 taken along line 1—1 in FIG. 1. In FIG. 2, wheel 10 has hub 14 and rim 16, which are coupled by contoured plate or web member 18. Wheel 10 includes front or outboard face 12, and rear or inboard wheel face 20. More specifically, hub 14 has outboard hub face 22, inboard hub face 24 and axle bore 26 with longitudinal axis 28. Similarly, rim 16 has outboard rim face 30, inboard rim face 32, tread 34 and flange 36.

Plate 18 in FIG. 2 is a bowed or arcuate section with a centerline 38 and a generally uniform wall thickness, but further having a minimal wall thickness x. Plate 18 is coupled to hub 14 and blends into hub 14 at first front hub fillet 40 and first rear hub fillet 42. Similarly, plate 18 is connected to rim 16 at second front rim fillet 44 and second rear rim fillet 46. The contour of plate 18 is generally arcuate, which arc shape is not necessarily a uniform shape or curvature. However, in the illustrated embodiment of FIGS. 2 and 3, minimum wall thickness x between rim 16 and hub 14 may be between five-eighth (0.625) inch (1.59 cm.) and one and one-eighth (1.125) inch (2.86 cm.). In these illustrations, plate 18 is concave at front wheel face 12 and convex at rear wheel face 20.

In wheel 10, the structure of plate 18 has a specific relationship to hub 14 and rim 16 to reduce or minimize residual tensile stress in rim 16 from the thermal effects of a heavy braking condition, as well as minimizing the axial deflection of wheel flange 36 during braking and normal service. The above-noted hub-plate-rim relationship is illustrated and characterizable on the cross-sectional view of wheel 10 in FIG. 2 by angular and measurable distances between wheel components.

Rim 16 in FIG. 2 has radius 45 at the corner intersection of rim fillet 44 and front face 30. A second corner radius 47 couples rear rim fillet 46 and rear rim Face 32. Line 52 extending between the tangential intersection 54 of radius 45 and front rim face 30, and the tangential intersection 56 at the junction of rear rim face 32 and second radius 47 has a midpoint 50. A radial axis, or first radius, 62 extends from longitudinal axis 28 through midpoint 50 at rim 16.

Third radius 49 is provided at the intersection of hub front face 22 and hub front fillet 40, and fourth radius 51 is at the intersection of hub rear face 24 and hub rear fillet 42. Hub line 64 extends between the tangential intersection 66 of hub front or outboard face 22 with third radius 49, and the tangential intersection 68 of hub rear or inboard face 24 and fourth radius 51. Hub offset or reference line 70 is parallel to and displaced radially outward two (2) inches from hub line 64, which outward radial measurement is considered from longitudinal axis 28. Offset line 70 intersects plate front surface 72 and plate rear surface 74 at points 76 and 78, respectively. The segment of line 70 between points 76 and 78 has midpoint 80. In this description, hub offset line 70 is utilized to overcome any negative impact from the fillet mass and wheel geometry at the mating location of plate 18 and hub 14, and it is not a construction or specification point for assembly in the manufacture of wheel 10.

Figure 3:
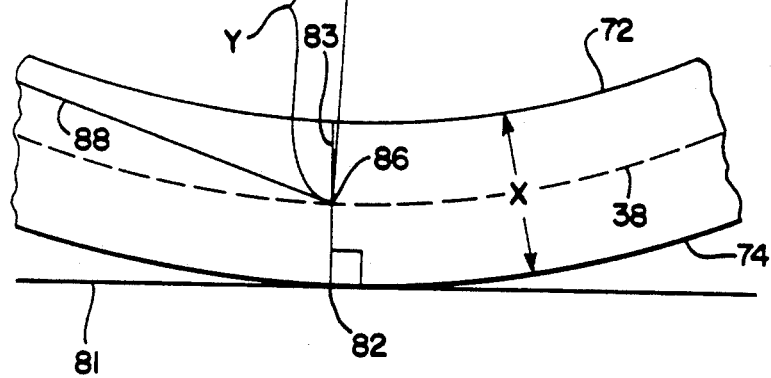
FIG. 3 is an enlarged view of a portion of the plate segment of the cross-sectional view of FIG. 2.

In the embodiment of FIGS. 2 and 3, a second radius 81 from longitudinal axis 28 contacts the most convex point of plate rear surface 74 at tangent 82. In FIG. 3, a normal 83 to second radius 81 at tangent 82 intersects plate centerline 38 at third reference point 86. The geometry of plate 18 and the tangential relationships at tangent point 82 are more clearly seen in FIG. 3, which is an enlarged view of a plate portion at tangent line 81 and plate 18 at the lowest or most convex point of wheel 10 in FIG. 2. First projection line 88 in the Figures extends through second reference point 80 and third reference point 86, and intersects hub line 64 at fourth reference point 90.

Second projection line 94 extends through midpoint 50 and fourth reference point 90 on hub line 64. Construction line 84, which extends through third reference point 86, intersects and is perpendicular to second projection line 94 at point 92. Maximum plate curve depth y between third reference point 86 at plate centerline 38 and intersection point 92 is characteristic of the wheel structure. In addition, the arc separation or angle of inclination, A, is the arc distance in either direction of rotation between radial axis 62 and projection line 94 about midpoint 50. The maximum curvature depth in the illustrated structure of FIGS. 2 and 3, and with particular reference to railway wheels greater than 30 inches (76.2 cm.) in diameter, is greater than or equal to 1.75 inches (4.45 cm.) and less than or equal to 2.5 inches (6.35 cm.). The "maximum depth of curvature" is considered in the several figures as the plate is not necessarily characterized by a single radius of curvature, but rather it may have a continuously varying radial contour between hub 14 and rim 16.

In the preferred and exemplary embodiment of FIGS. 2 and 3, wheel 10 is a 36 inch (about 920 mm.) railway wheel and, plate 18 is concave at wheel front surface 12 and thus convex at wheel rear surface 20. Wheel 10 has a depth of curvature of at least one and seventy-five hundredths (1.75) inches (4.45 cm.) from point 92, the intersection of lines 94 and 84. It is preferred that the plate curve depth or maximum depth of curvature, y, does not exceed two and one-half (2.5) inches (6.35 cm.), as noted above.

The separation distance between points 50 and 90 along line 94 is noted as z, which is noted in FIG. 2 between the two parallel dimensional lines extending from points 90 and 50. In this preferred embodiment, intersection 92 is provided along line 94 at a predetermined position, which position is between about fifty-eight (58) and about sixty-seven (67) percent of the length of z from point 90 in a direction toward midpoint 50. In the embodiment of FIG. 2, and utilizing midpoint 50 as the focal or pivot point, line 94 is angularly displaced from radial axis 62 an arc distance no greater than ten (10) arc degrees in a direction toward wheel front face 12. The location of intersection point 92 may be noted as being between about 71.5% and 77.6% of the distance from longitudinal axis 28 toward midpoint 50 along the line connecting points 50 and 90, which line 94 in FIG. 2 is extended to intersect axis 28 at point 91.

Figure 4:
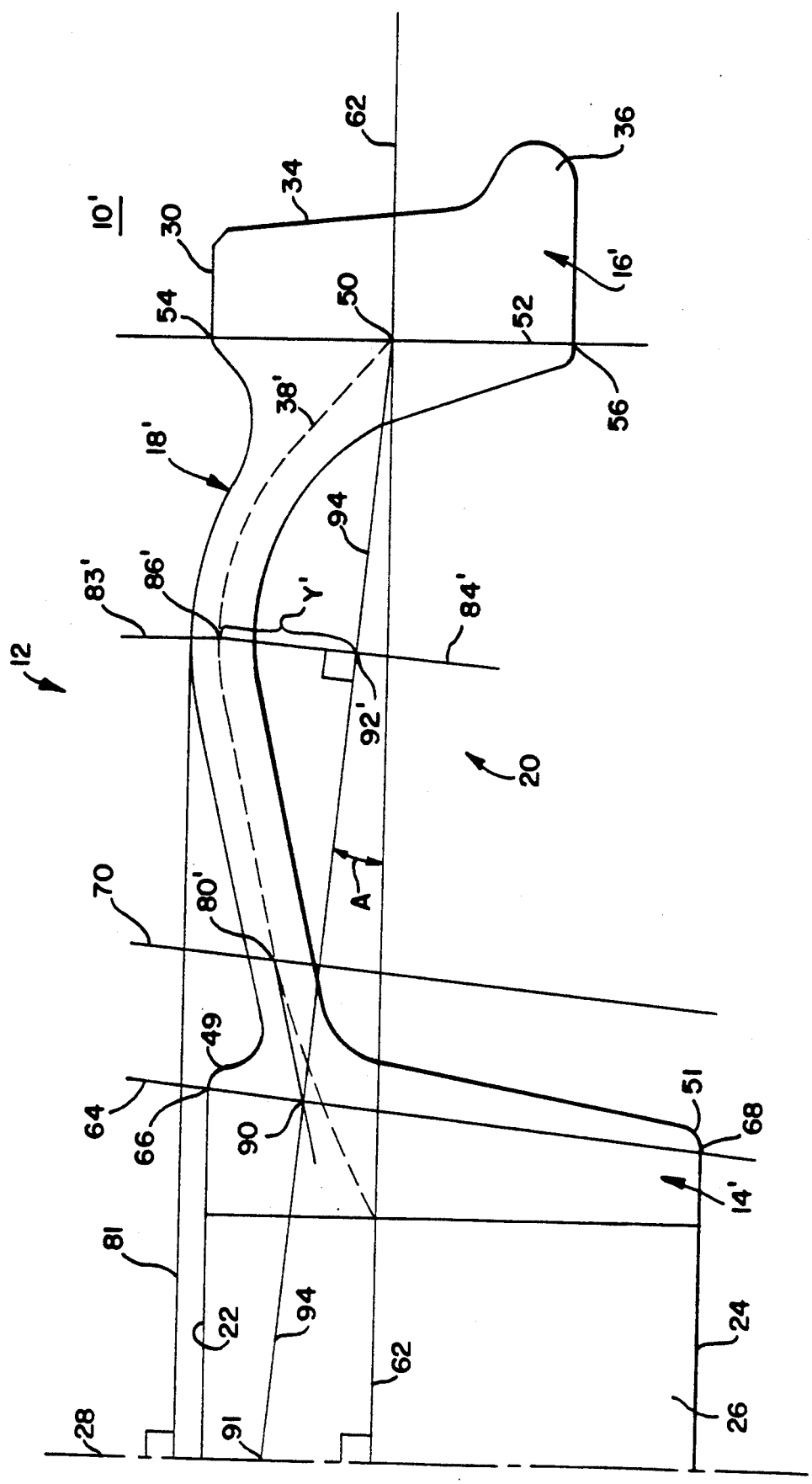
FIG. 4 is a cross-sectional view of a wheel as in FIG. 2 with a plate curvature in the opposite direction.

In an alternative embodiment shown in FIG. 4, wheel 10' has plate 18', which is convex in a direction toward front wheel face 12 and consequently is concave at rear wheel face 20. In FIG. 4, the prime symbol is utilized to characterize similarly numbered elements noted in the embodiment of FIGS. 2 and 3. Point 86' along centerline 38' of plate 18' has a maximum depth of curvature, y', which is shown in a direction opposite to the depth of curvature y for convex plate 18 of wheel 10 in FIGS. 2-4. In this configuration of wheel 10', y' is between about 1.95 inches (4.95 cm.) and less than 3.25 inches (8.26 cm.). However, in this embodiment, line 94 is again pivotable about midpoint 50 from radial axis 62 up to about 10 arc degrees toward wheel front face 12 and in a direction toward wheel rear face 20 up to about five (5) arc degrees from axis 62. Intersection point 92' is again between about 58 and 67 percent of the distance from point 90 along the line 94 in a direction toward midpoint 50. The location of intersection point 92 or 92' may also be noted as being between about 71.5% and 77.6% of the distance from longitudinal axis 28 toward midpoint 50 along the line connecting points 50 and 90, which line in FIG. 4 is extended to intersect axis 28 at point 91.

Wheel 10 provides a means of controlling axial deflection of flange 36 and residual tensile stress in rim 16 from thermally induced expansion-contraction cycling associated with braking of the railcar and the wheel. More specifically and with reference to wheel 10 in FIGS. 2 and 3, deflection is noted as an axial movement, up to a maximum of about 0.050 inch (1.25 mm.), of flange 36 about hub 14 toward rear hub face 24. In FIGS. 2 and 3, axial deflection of flange 36 can be considered downward or upward movement, which is an axial direction, of flange 36 as hub 14 remains stationary. This flange deflection is generally characteristic of movement of flange 36 relative to hub 14 in rail wheels 10, and is illustrated as distance 'D' in FIGS. 5-7.

Deflection of wheel flange 36 and more specifically flange face 102 are illustrated in FIGS. 5 and 7 for negative and positive deflection, respectively. In FIGS. 5 and 6, plate 18 is, respectively,-concave and convex with regard to outboard hub face 22, and a midpoint 100 is noted on flange face 102 of rim 16. Axial rim deflection in a macroscopic scale illustration, which in FIGS. 5-7 is amplified by a factor of ten (10) for illustration purposes, may be taken as the axial displacement D of midpoint 100. Wheel 10 in FIG. 5 grows radially at elevated temperatures, and rim 16 at point 100 deflects a distance D toward rear hub face 24. Point 100 was elected to note a clearly physical position along face 102 for reference and discussion purposes. Face 102 is the lateral contact surface between wheel rim 16 and rail 13. As shown in FIG. 6, rim 16 may also deflect toward outer hub face 22.

FIG. 7 illustrates a prior art railway wheel currently available and in prominent use throughout Europe. In a comparative analysis, wheel 10 of the present invention, as shown in FIGS. 5 and 6, was analyzed with a forty-five (45) horsepower load applied for 60 minutes into the tread of a wheel with a diameter of 920 mm. (about 36 inches), which input load resulted in the illustrated rim deflection shown in FIG. 5. The above-noted European wheel of FIG. 7, which is also 920 mm. (about 36 inches) in diameter, was similarly analyzed under the same input load for the same time. The resultant flange deflection for this European wheel is visibly greater magnitude and in a direction toward front hub face 22. The analyses were conducted on a simulation analysis for equivalent load inputs. Thus, it can be seen that wheel deflection for the present invention will be significantly smaller than expected for current wheel designs at the same input, and in the particular illustrations of FIGS. 5 and 7 the deflections of flange 36 will be in opposite directions.

Upon brake application at the wheel tread 34 or rim 16, the temperature of rim 16 increases and wheel 10 tends to radially expand. However, web or plate 18 secured to hub 14 forces an outwardly radial and an axial displacement of flange 36 relative to hub 14 and axis 28. Wheel 10 will experience elevated temperatures at rim 16 and plate 18, as the wheel temperature decreases to an ambient or equilibrium temperature, residual tensile stresses are induced in rim 16 from this expansion-contraction cycle. The present wheel structure inhibits wheel axial flange deflection below 0.050 inch (1.25 mm.), as compared to older design wheels with axial flange deflections up to about 0.225 inch (about 5.72 mm.).

A wheel 10 with a convex plate curvature toward front hub surface 22 is illustrated in FIG. 6, and has an axial flange deflection D toward front hub surface 22, but significantly less than the deflection of the prior art wheel of FIG. 7. In a wheel with a diameter of 30-38 inches (76.2-96.52 cm.) and constructed in accordance with the above-described invention, the axial flange deflection will be suppressed below 0.050 inch (1.25 mm.) and residual tensile stresses are significantly below the residual tensile stresses of the wheel illustrated in FIG. 7. Reduced residual tensile stress and lower deflection conditions for wheels provided in accordance with the present invention result for wheels produced by any method of manufacture, such as casting, forming, forging or machining.

Those skilled in the art will recognize that certain variations can be made in the illustrated embodiments. While only specific embodiments of the invention have been described and shown, it is apparent that various alterations and modifications can be made therein. It is, therefore, the intention in the appended claims to cover all such modifications and alterations as may fall within the true scope and spirit of the invention.

We claim:

1. A steel railway wheel providing low axial flange deflection and low, thermally-induced, residual tensile stress effects, said wheel comprising:

a hub with an axial bore and a longitudinal axis;

a rim generally concentric with said bore;

a plate extending generally radially outward from said hub to said rim, said plate having a substantially arcuate cross-section, a first front fillet, a second front fillet, a first rear fillet and a second rear fillet;

said hub having a hub front face, a hub front corner radius, a hub rear face and a hub rear corner radius, said hub front corner radius tangent to said hub front face at a hub front tangent and merging with said front face with one of said plate first and second front fillets, said hub rear corner radius tangent to said hub rear face at a hub rear tangent and merging with said hub rear face with one of said plate first and second rear fillets;

said rim having a rim front face, rim front corner radius, a rim rear face and a rim rear corner radius, said rim front corner radius tangent to said rim front face at a rim front tangent and merging with said rim front face with the other of said plate first and second front fillets, said rim rear corner radius tangent to said rim rear face at a rim rear tangent and merging with said rim rear face with the other of said plate first and second rear fillets;

said rim front face tangent and rim rear face tangent defining a midpoint therebetween;

a first radius extending from said longitudinal axis to said midpoint;

a radial axis extending from said midpoint in a direction toward said longitudinal axis and angularly displaced from said first radius at an angle of inclination up to ten (10) arc degrees from said first radius toward said hub front face;

said plate having a plate contour generally concave to said hub front face, a wall thickness and a centerline generally conforming to said plate contour midway through said wall thickness, said plate having a maximum depth of curvature at said plate centerline with an offset distance from said radial axis between said hub and said midpoint, which offset distance is between about 1.75 inches (4.45 cm.) and about 2.50 inches (6.35 cm.).

2. A steel railway wheel as claimed in claim 1 further comprising a hub line extending between the hub front and rear tangents;

a hub-line offset being a line parallel to said hub line radially outward from said longitudinal axis, which hub-line offset intersects said plate front face and rear face, and has a first reference point at the midpoint between said front and rear plate faces along said hub-line offset;

a second radius from said longitudinal axis contacts said plate and is tangent to the most convex point of one of said plate front and rear surfaces, a second reference point midway between said plate front and rear faces on a normal to said second radius at said tangent with said one plate face;

a line defined through said first and second reference points intersects said hub line at a third reference point;

said radial axis extending from said midpoint through said third reference point, said angle of inclination defined between said first radius and said radial axis;

a fourth reference point is defined at the intersection of a normal from said second reference point to said radial axis, and said maximum depth of curvature of said plate is the distance between said second reference point and said fourth reference point.

3. A steel railway wheel as claimed in claim 2 wherein said hub-line offset is radially outwardly displaced by two (2) inches (5.08 cm.) from said hubline.

4. A steel railway wheel as claimed in claim 3 wherein said fourth reference point is provided at a distance radially outward from said third reference point a distance between about fifty-eight percent (58%) and sixty-seven percent (67%) of the distance between said midpoint and said third reference point.

5. A steel railway wheel as claimed in claim 3 wherein said line extending between said third reference point and said midpoint intersects said longitudinal axis at a fifth reference point, said fourth reference point provided at a distance radially outward from said fifth reference point along said line extending between said third reference point and said midpoint a distance between about seventy-one and five-tenths percent (71.5%) and, seventy-seven and six-tenths percent (77.6%) of the distance between said longitudinal axis and said midpoint.

6. A steel railway wheel as claimed in claim 1 wherein said plate has a single direction of curvature concave with respect to said hub front face.

7. A steel railway wheel as claimed in claim 1 wherein said plate has a minimum wall thickness between said hub and said rim between about five-eighth (0.625) inch (1.59 cm.) and about one and one-eighth (1.125) inch (2.86 cm.).

8. A steel railway wheel providing low axial flange deflection and low, thermally-induced, residual tensile stress effects, said wheel comprising:

a hub with an axial bore and a longitudinal axis;

a rim generally concentric with said bore;

a plate extending generally radially outward from said hub to said rim, said plate having a substantially arcuate cross-section, a first front fillet, a second front fillet, a first rear fillet and a second rear fillet;

said hub having a hub front face, a hub front corner radius, a hub rear face and a hub rear corner radius, said hub front corner radius tangent to said hub front face at a hub front tangent and merging with said front face with one of said plate first and second front fillets, said hub rear corner radius tangent to said hub rear face at a hub rear tangent and merging with said hub rear face with one of said plate first and second rear fillets;

said rim having a rim front face, rim front corner radius, a rim rear face and a rim rear corner radius, said rim front corner radius tangent to said rim front face at a rim front tangent and merging with said rim front face with the other of said plate first and second front fillets, said rim rear corner radius tangent to said rim rear face at a rim rear tangent and merging with said rim rear face with the other of said plate first and second rear fillets;

said rim front face tangent and rim rear face tangent defining a midpoint therebetween;

a first radius extending from said longitudinal axis to said midpoint;

a radial axis extending from said midpoint in a direction toward said longitudinal axis and angularly displaced from said first radius at an angle of inclination between up to ten (10) arc degrees from said first radius toward said hub front face and five (5) arc degrees toward said rear hub face;

said plate having a plate contour generally convex to said hub front face, a wall thickness and a centerline generally conforming to said plate contour midway through said wall thickness, said plate having a maximum depth of curvature at said plate centerline with an offset distance from said radial axis between said hub and said midpoint, which offset distance is between about 1.95 inches (4.95 cm.) and about 3.25 inches (8.26 cm.).

9. A steel railway wheel as claimed in claim 8 further comprising a hub line extending between the hub front and rear tangents;

a hub-line offset being a line parallel to said hub line radially outward from said longitudinal axis, which hub-line offset intersects said plate front face and rear face, and has a first reference point at the midpoint between said front and rear plate faces along said hub-line offset;

a second radius from said longitudinal axis contacts said plate and is tangent to the most convex point of one of said plate front and rear surfaces, a second reference point midway between said plate front and rear faces on a normal to said second radius at said tangent with said one plate face;

a line defined through said first and second reference points intersects said hub line at a third reference point;

said radial axis extending from said midpoint through said third reference point, said angle of inclination defined between said first radius and said radial axis;

a fourth reference point is defined at the intersection of a normal from said second reference point to said radial axis, and said maximum depth of curvature of said plate is the distance between said second reference point and said fourth reference point.

10. A steel railway wheel as claimed in claim 9 wherein said hub-line offset is radially outwardly displaced by two inches from said hub line.

11. A steel railway wheel as claimed in claim 8 wherein said fourth reference point is provided at a distance radially outward from said third reference point a distance between about fifty-eight percent (58%) and sixty-seven percent (67%) of the distance between said midpoint and said third reference point.

12. A steel railway wheel as claimed in claim 8 wherein said plate has a single direction of curvature convex with respect to said hub front face.

13. A steel railway wheel as claimed in claim 8 wherein said line extending between said third reference point and said midpoint intersects said longitudinal axis at a fifth reference point, said fourth reference point provided at a distance radially outward from said fifth reference point along said line extending between said third reference point and said midpoint a distance between about seventy-one and five-tenths percent (71.5%) and, seventy-seven and six-tenths percent (77.6%) of the distance between said longitudinal axis and said midpoint.

14. A steel railway wheel as claimed in claim 8 wherein said plate has a minimum wall thickness between said hub and said rim between about five-eighth (0.625) inch (1.59 cm.) and about one and one-eighth (1.125) inch (2.86 cm.).

* * * * *